United States Patent
Ferreira et al.

(10) Patent No.: US 12,360,196 B2
(45) Date of Patent: Jul. 15, 2025

(54) PEER-BASED POSITIONING OF MOBILE DEVICES

(71) Applicant: Dell Products L.P., Round Rock, TX (US)

(72) Inventors: Paulo Abelha Ferreira, Rio de Janeiro (BR); Nalinkumar Mistry, Ottawa (CA); Pablo Nascimento da Silva, Niterói (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 365 days.

(21) Appl. No.: 17/813,217

(22) Filed: Jul. 18, 2022

(65) Prior Publication Data

US 2024/0019530 A1    Jan. 18, 2024

(51) Int. Cl.
*G01S 5/02* (2010.01)
*H04W 64/00* (2009.01)

(52) U.S. Cl.
CPC ........... *G01S 5/0284* (2013.01); *H04W 64/00* (2013.01)

(58) Field of Classification Search
CPC ........ G01S 5/0284; G01S 5/0205; G01S 5/14; G01S 5/0244; H04W 64/00
See application file for complete search history.

(56) References Cited

U.S. PATENT DOCUMENTS

2004/0147267 A1* 7/2004 Hill ................. H04W 64/00
                                                          455/456.1
2016/0323717 A1* 11/2016 Friday ............... G01S 5/0278

OTHER PUBLICATIONS

Bencak, Primož, Darko Hercog, and Tone Lerher. "Indoor Positioning System Based on Bluetooth Low Energy Technology and a Nature-Inspired Optimization Algorithm." Electronics 11.3 (2022): 308.
Porter, Donavan.,Myhr, Reidar.Texas Instruments. Bluetooth® Angle of Arrival (AoA) Antenna Design. Application Report. TIDA029. Jul. 2019.
U.S. Appl. No. 17/663,423, filed May 14, 2023, Gottin, et al.

* cited by examiner

Primary Examiner — Joseph E Dean, Jr.
(74) Attorney, Agent, or Firm — Workman Nydegger

(57) ABSTRACT

Peer-based positioning of nodes in an environment is disclosed. A node is able to determine its own position using sources. The sources may include fixed and/or mobile beacons. Each of the sources is associated with a distance error and a position error. These errors, along with distance measurements between the node and each of the sources, are used to determine a position and a total positioning error, which reflects the accuracy of the determined position.

20 Claims, 8 Drawing Sheets

PEER-BASED POSITIONING OF MOBILE DEVICES

FIELD OF THE INVENTION

Embodiments of the present invention generally relate to determining the position of objects operating in various environments. More particularly, at least some embodiments of the invention relate to systems, hardware, software, computer-readable media, and methods for determining the position, location, or positioning error of mobile objects in indoor environments.

BACKGROUND

Logistics in an environment such as a warehouse can be difficult to perform at least because many different objects in the environment may exist and/or operate simultaneously. Many of the objects in the warehouse, for example, are autonomous and mobile in nature while other objects are stationary or movable. In essence, all objects in an environment, whether mobile, movable, or stationary, may be a hazard from the perspective of each object. Consequently, it is difficult to coordinate the movement of multiple objects and ensure that undesirable interactions do not occur. Logistics may also ensure that a device does not experience an undesirable event (e.g., cornering while moving too fast) by itself.

Improving the autonomy of mobile objects would improve the operation and efficiencies of logistical operations in these environments. Improving the autonomy of mobile objects, however, often requires the locations or positions of the objects in the warehouse to be known.

Although it is possible to perform positioning operations in indoor environment, these positioning operations often face several challenges. In addition to cost, these challenges include the fact that accuracy decays with distance and that fact that mobile objects are often constrained from a resource perspective (e.g., memory and processing).

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
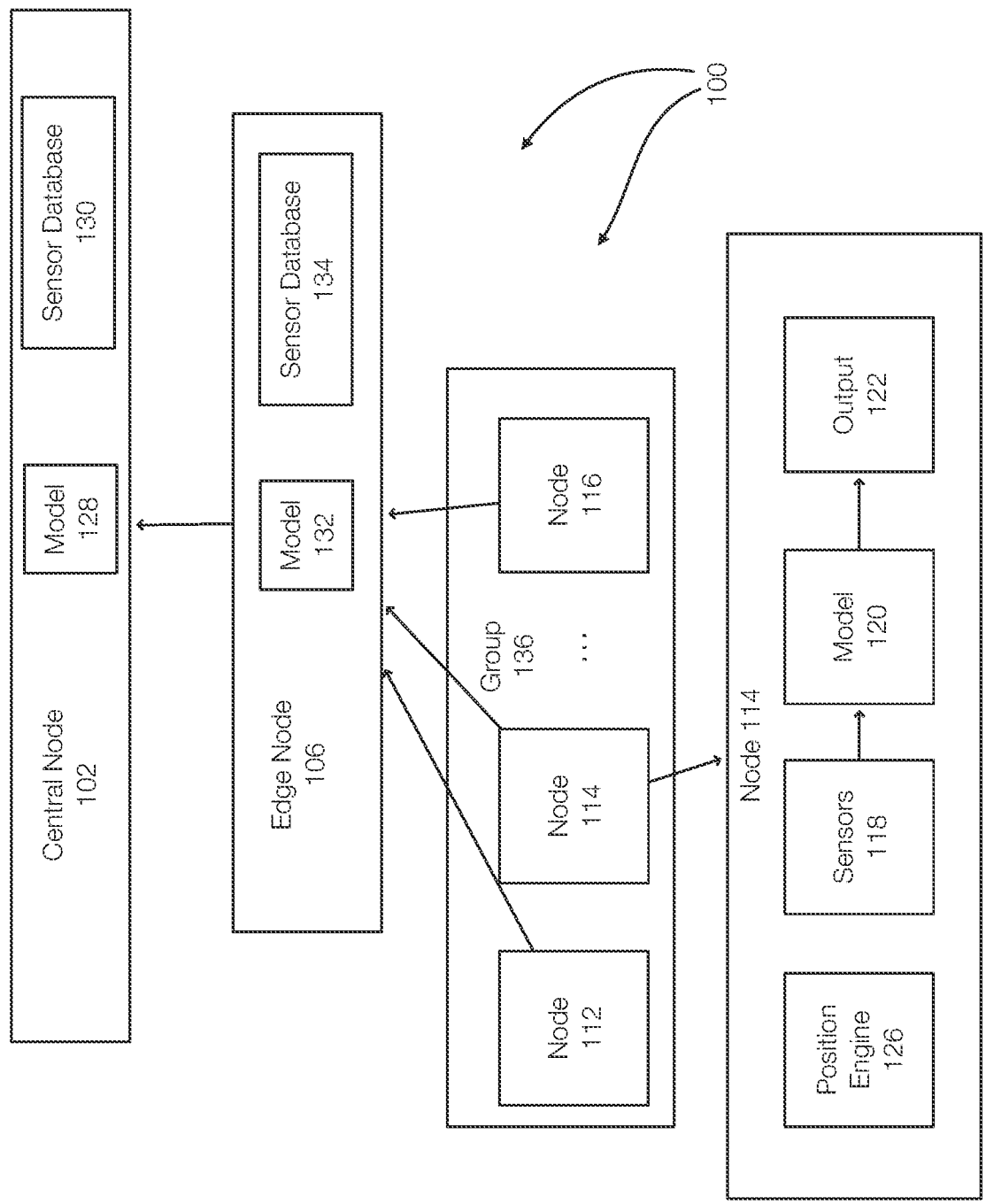
FIG. 1 discloses aspects of an environment in which logistics operations including positioning operations are performed.

Embodiments of the present invention generally relate to logistics and logistics operations, which include positioning operations. More particularly, at least some embodiments of the invention relate to systems, hardware, software, computer-readable media, and methods for determining positions of objects and/or positioning errors of objects in an environment using fixed and/or mobile beacons.

An environment, such as a warehouse, may include mobile objects, movable objects, and/or stationary or static objects. These objects may include or be associated with sensors of varying types. The data generated by the sensors may be analyzed to detect events and/or to perform actions upon detecting an event. For example, the sensor data, or features thereof, may be input to a machine learning model (such as an event detection model). Actions performed at or by the object may depend on the inference or output of the machine learning model.

The sensor can be used to perform logistics operations, which include by way of example and not limitation, positioning operations, position/location determining operations, positioning error operations, or the like or combination thereof. These operations are generally referred to herein as positioning operations and the specific output (e.g., position or location, positioning error) may be determined from context. More generally a positioning operation may include determining a total positioning error of an object and/or a position or location of the object in an environment. The accuracy of the object's position or location is determined by the total positioning error. As described in more detail below, the total positioning error may be a combination of a positioning error and a distance error.

In one example, positioning operations are performed on or at a mobile object but may be performed separately from the mobile object. Embodiments of the invention may determine the position of an object such that the position, along with other sensor data, can be used by models such as an event detection model.

In a warehouse environment and by way of example, mobile objects may include, but are not limited to, forklifts (manual or automated), autonomous mobile robots or vehicles, automatic guided vehicles, mobile machines capable of being driven/pulled/pushed/moved, and the like. Embodiments may relate to mobile devices or vehicles operating in, by way of example, environments including manufacturing, retail, and other environments.

Embodiments of the invention are achieved, in part, by equipping the objects in the environment with hardware such as sensors, processors, memory, networking hardware, radios, or the like. In some examples, the objects may already be equipped with this type of hardware or portions thereof. The hardware may depend on the nature of the associated object.

The objects in the environment may also have radio devices such as BLE devices, RFID readers/tags, WiFi devices, or the like. These radios are examples of sensors that may be operable to aid in determining the position of a mobile object. In one example, the position of an object is determined at the object using the resources of the object. In other examples, the position may be determined remotely using similar data and then transmitted to the object. In the latter case, the position information may be delayed.

The hardware (and/or any software thereon) may be referred to as a node. However, reference to a node may also constitute a reference to the object associated with the node and on which the node is attached. Reference to an object, such as a forklift, may refer to the object and/or the node. The following discussion generally references nodes.

Nodes in the environment may communicate with a near edge node operating at a near-edge infrastructure and/or a central node operating in a datacenter. The central node is typically more computationally powerful than the near edge nodes and the near edge nodes are typically more computationally powerful than the nodes. Embodiments of the invention can be implemented with/without a central node, in which case the near edge node functions as a central node.

The sensors associated with a node may include, by way of example, position sensors (e.g., radios, tags), inertial sensors and/or proximity sensors. These sensors may generate data that allows movement to be detected, measured, or inferred. The nodes may each have sufficient hardware (e.g., processor, memory, networking hardware) to process data generated by the node's sensors and/or data about other nodes that is broadcast by a central node, the near edge node, or by the other local nodes in the environment.

FIG. 1 discloses aspects of an environment in which embodiments of the invention may be deployed or implemented. FIG. 1 illustrates a system (e.g., a logistics system) 100 that includes a central node 102 (A) and an edge node 106 (N). The edge node 106, for example, may be associated with a specific environment and may operate with respect to a group 136 of nodes such as the nodes 112, 114, and 116.

More specifically, the edge node 106 may be associated with a set or group 136 of nodes ($E_0, \ldots E_i$), represented by the nodes 112, 114, and 116. In this example, forklifts or automated mobile robots (or the resources thereon) may be examples of the nodes 112, 114, and 116.

The node 114 ($E_1$) is further may include sensors 118 and a model 120, which generates an inference or an output 122. The model 122 may be representative of multiple models. Each model may be able to detect a certain type of event using the same or similar input data from the sensors 118. The data generated by the sensors 118 may be stored as a sensor dataset $S^i$.

In some examples, the data generated by the sensors 118 is provided to the central node 102, which may also have a copy of the model 120, represented as model 128. The edge node 106 may include a model 132 and sensor database 134. The edge node 106 may act as the central node 102 in some examples. The sensor database 130 may store sensor data received from all of the nodes 112, 114, 116. Thus, the node 114 may store sensor data generated by the node 114. The edge node 106 may store sensor data generated by the nodes 112, 114, and 116 in the database 134. The sensor database 134 includes sensor data from all nodes associated with all of the edge nodes 104, 106, 108, and 110. The sensor database 130 may store the sensor data from the edge node 106 and/or other edge nodes when present, which may correspond to other environments, and which may be similarly configured.

At the node 114, only the recently generated data is generally stored. Local data may be deleted after transmission to the central node 102 and/or to the edge node 106. Inferences for a time t are generated using the most recent sensor data. When working with trajectories, the model 120 may use one or more collections of sensor data to determine a trajectory. For example, a trajectory may be inferred from three successive position and/or inertial samples. The output 122 (e.g., inference q) of the model 120 (M) may be used for decision making with little delay at the node 114.

The central node 102 (e.g., implemented in a near edge infrastructure or in the cloud) may be configured to communicate with the node 114. The communication may occur via the edge node 106. The communication may be performed using radio devices through hardware such as a router or gateway or other devices (e.g., the edge node 106). The node 114 may also receive information from the central node 102 and use the information to perform various operations including logistics operations.

The sensors 118 may include position sensors and inertial sensors that generate positional data that determine a position or trajectory of an object in the environment. Positional data can be collected as time series data, which can be analyzed to determine a position of the forklift, a velocity of the forklift, a trajectory or direction or travel, a cornering, or the like. The inertial sensors allow acceleration and deceleration to be detected in multiple directions and axes.

In one example, a map of the environment is generated and may be stored at the central node 102 and/or at the edge nodes 104, 106, 108, and 110. The system may be configured to map the position data received from the nodes into a map of the environment. The node 114 can determine its own position within the environment. The positions of all nodes (objects) can be determined with respect to each other and with respect to the environment.

The central node 102 may include a model 128 and a sensor database 130. The sensor database 130 may include a database for different sensor types. Thus, the sensor database 130 may include a position data database, an inertial database, and the like. In another example, the sensor database 130 may store all sensor data together and/or in a correlated form such that position data can be correlated to inertial data at least with respect to individual nodes and/or in time.

In one example, the local model 120 is trained at the central node 102 and deployed to the relevant nodes 112, 114, and 118. The local model 120 is trained using available (historical) positioning and/or inertial measurement data (and/or other sensor data, which may include video data). After training, the local model 120 may be deployed to the nodes. In one example, the models 120 and 128 are the same. One difference is that the local model 120 may operate using locally generated data at the node 114 as input while the model 128 may use data generated from multiple nodes in the multiple environments as input (e.g., the sensor data in the sensor database 130).

The position sensors 118, which may include radios such as BLE radios or BLE devices, may be associated with a position engine 126. The position engine 126 may be configured to use the sensors 118 (or the BLE equipment) to determine a position of the node 114 and/or a positioning error of the node 114. In one example, the BLE radios or equipment of multiple fixed beacons or nodes are involved or used by the position engine 126 to determine the position of the node 114.

Embodiments of the invention may be practiced using indoor positioning systems (IPS) such as ultra-wideband (UWB), visible light communication (VLC), radio frequency identification (RFID), and Wi-Fi. Using these signals, the general process is to obtain the distance between a reader and a transmitted by analyzing changes in signal properties such as delay, phase changes, attenuation, signal strength, or the like.

Even if some of these methods are very accurate (e.g., UWB and VLC), these methods incur prohibitive costs to cover large areas, such as a warehouse. Systems such as Wi-Fi and Bluetooth (e.g., BLE) are less expensive, but are susceptible to interference from other electromagnetic sources and are less accurate, particularly as distance increases between the beacon and the node.

Embodiments of the invention are discussed in the context of BLE, but other radio technologies can be used in embodiments of the invention. In one example, the location or position of a device relies on the received signal strength indication (RSSI). BLE IPS is based on RSSI and can also compute the angle of arrival (AoA). Localization techniques using BLE include distance-based techniques, fingerprinting-based techniques, and probability estimation techniques. Probability estimation techniques require good prior parameter estimation, which may not operate or work as expected. Fingerprinting often requires pre-calibration. Distance-based techniques face the challenge of signal degradation with distance.

The AoA can be determined when the receiver has at least two antennas. The AoA can be determined by measuring the phase disparity from the two antennas. This calculation is sensitive and requires that the antennas be carefully configured and maintained. Further, the AoA can be measured in two orthogonal planes, which allows for three dimensions angle measurements. However, the angle error increases rapidly with larger distances.

Embodiments of the invention relate to determining the position, location, and/or positioning error of a node in an environment using fixed beacons and/or by using other nodes as mobile beacons. This is advantageous because a mobile beacon may be closer to the node than a fixed or stationary beacon. In some instances, the moving beacon may be closer to node such that the moving beacon is more useful and accurate than a fixed beacon, which may be further away. When referring to nodes as mobile or moving beacons, these nodes may only be used for positioning operations when stationary (e.g., when performing a stationary task or otherwise substantially still) in some embodiments.

Figure 2:
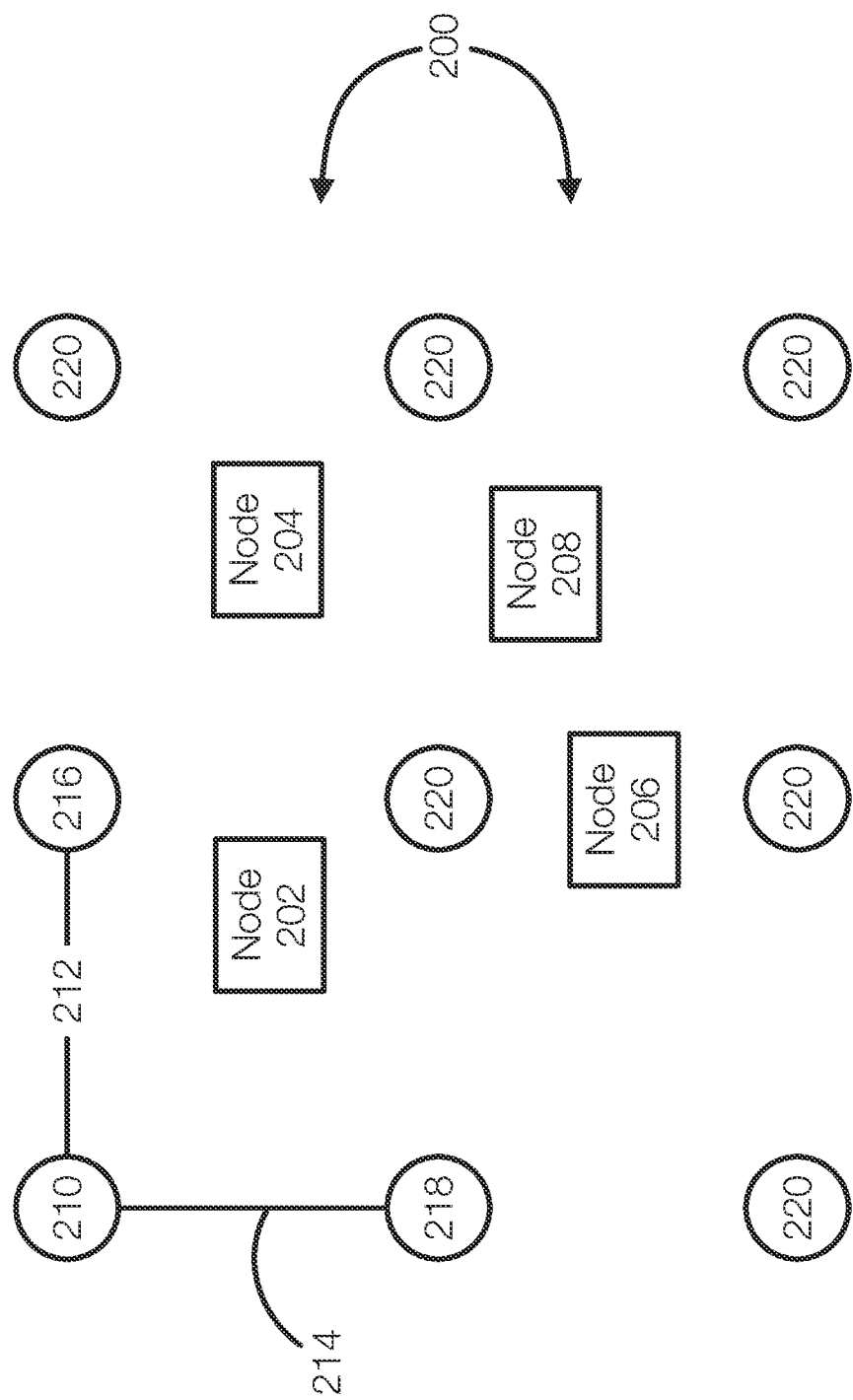
FIG. 2 discloses aspects of an environment where positioning operations are performed using fixed beacons and mobile beacons that may act as mobile beacons.

FIG. 2 discloses aspects of performing logistics operations including position or positioning operations in an environment. FIG. 2 illustrates an environment 200, such as a warehouse environment. The environment 200 includes fixed beacons, generally represented by the fixed beacons 220, 210, 216, and 218. The fixed beacons 210, 216, and 218 are also examples of the fixed beacons 220.

The placement and geometry or arrangement of the fixed beacons 220 in the environment 200 may vary and may depend on the structure or other characteristics of the environment 200. In this example, the beacons 220 are evenly spaced in two directions. Thus, a distance 210 separating the beacons 210 and 216 in a first direction is equal to a distance 214 between the beacons 210 and 218 in a second direction. However, the distances and directions can vary and do not need to be the same. Embodiments of the invention can adapt to any arrangement of the beacons.

The environment 200 may also include nodes, represented by the nodes, 202, 204, 206, and 208, that operate in the environment 200. The nodes 202, 204, 206, and 208, which are examples of the node 114, are mobile in nature and their relative positions within the environment 200 change with time.

As previously stated, the accuracy of a position determined using a positioning system such as BLU suffers with distance. Embodiments of the invention enable the node 204 to determine its position using any combination of fixed beacons 220 and other nodes 202, 206, and 208. When a node relies on the position/positioning error of another node to determine its position or positioning error, the node being relied on is referred to as a moving or mobile beacon. In addition, the beacons/mobile beacons used to determine a position and/or a positioning error are collectively referred to as sources.

Embodiments of the invention may allow a node 204 to select a specific combination of fixed beacons/mobile beacons. Embodiments of the invention improve the positioning accuracy using mobile beacons at least because the mobile beacons may be closer to the node whose position is being determined. Because the mobile beacon is closer to the node than, for example, a fixed beacon, positional accuracy is improved.

Embodiments of the invention may be used, by way of example, in situations where positioning data may be needed to perform or solve various tasks. In a warehouse environment, it may be necessary for forklifts to navigate a dynamic environment in order to load/unload pallets. In some instances, some of the mobile nodes may be stationary (e.g., while loading or unloading a pallet) or substantially stationary. In this example, the mobile node may serve as a mobile beacon for other peer nodes when stationary or substantially stationary.

In addition, the nodes may be able to perform peer-to-peer communication using radio or wireless communications. This includes BLE signals and/or metadata. The metadata may include a node identifier, timestamps, arrays of numbers, or the like. The BLE communication is required for position and metadata may be used for error and positioning purposes. However, the amount of data is typically small and is unlikely to hinder the planning or actions performed by a node.

As previously stated, one challenge faced by BLE positioning techniques is that the signal degrades with distance. Embodiments of the invention include an error model that focuses on quantifying error according to distance. Embodiments could incorporate other sources of error, such as electromagnetic fields, but this requires the added cost of additional sensing and additional orchestration. Embodiments of the invention may advantageously rely on positioning or BLE signals to tune the positioning measurements.

Figure 3:
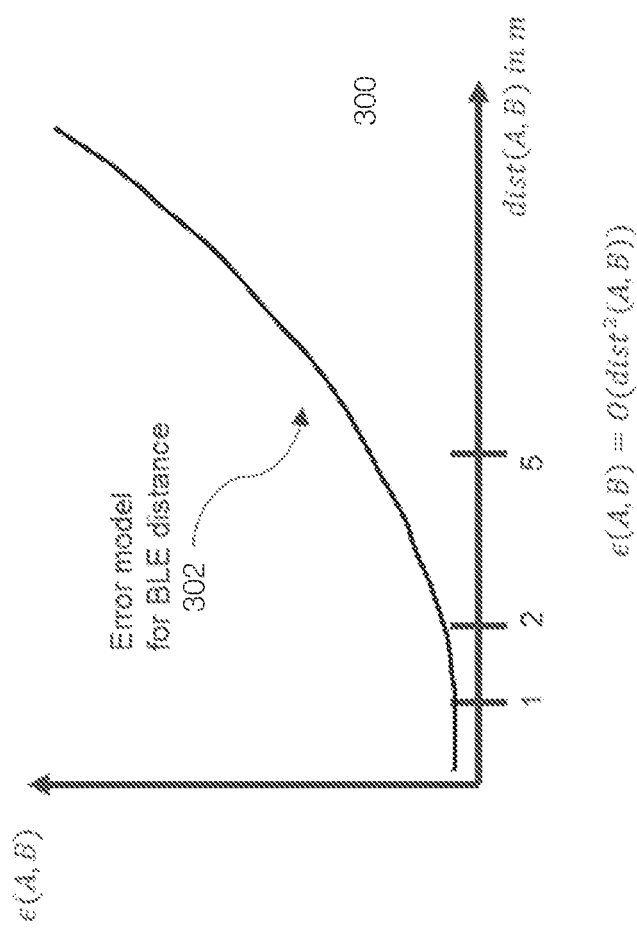
FIG. 3 discloses aspects of an error model for positioning operations.

FIG. 3 illustrates an example of an error function that uses the distance between A and B to output the expected distance error due to signal degradation. In one example, an error function or distance error is defined ($\epsilon(A, B)$) that uses the distance between two beacons A and B (dist(A, B)) to output the expected distance error due to signal degradation. A graph 300 includes an error model 302 for an error function for BLE distance. As illustrated, the error increases with distance, representing the degradation in accuracy with distance.

With an error function ($\epsilon(A, B)$), a model can be derived or determined that integrates three sources of distance into a triangulation calculation, each source incurring its own error.

In one example, the position or positioning error of a specific node is determined by considering at least three sources in one example, the sources may include fixed beacons in the environment and/or mobile beacons (e.g., peer mobile nodes acting as mobile beacons).

Each source used by a mobile node to determine its position may be associated with two distinct errors. The first error is a quadratic distance error (or distance error) and may be determined from the function ($\epsilon(A, B)$). The distance error is:

$\epsilon(A,B)=0(dist^2(A,B))$.

In other words, the distance error is incurred by the model for errors related to BLE distance measurements.

The second error is a positioning error $\sigma(A)$. The positioning error is incurred by a mobile beacon. More specifically, the positioning error of fixed beacons (sigma or $\sigma$) is always zero. The positioning error of mobile nodes (or mobile beacons) may be calculated from the total triangulation error, which is the sum of the square of errors induced by three sources in one example.

Figure 4:
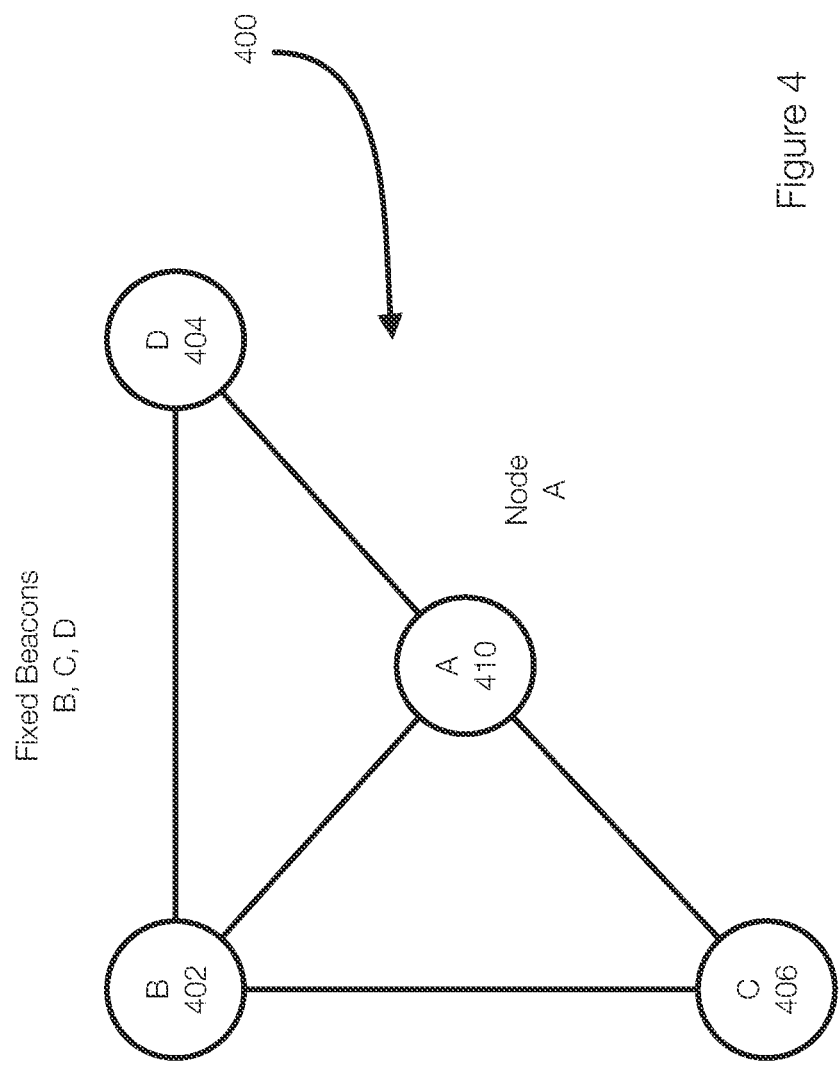
FIG. 4 discloses aspects of a mobile node performing a positioning operation using fixed beacons.

FIG. 4 discloses aspects of determining a position of a node or a positioning error of a node in an environment. In this example, the environment 400 includes fixed beacons B 402, C 404, and D 406. A node or mobile device A 410 is also illustrated.

The total positioning error or total error is a combination of the distance error and the positioning error. In this example, the total positioning error includes the errors from each of the sources. Each of the sources is associated with two errors: the positioning error and a distance error. In this example of FIG. 4, the positioning error $\sigma(B)$, $\sigma(C)$, and $\sigma(D)$ of the beacons 402, 404 and 406 is zero (0) because the beacons 402, 404, and 406 are fixed or stationary.

The total positioning error for the device A 410 is a total triangulation error when the beacons B, C, and D are the sources. More specifically, a total distance error is a sum of the square of errors induced by all three peers. The individual or pairwise errors are initially determined as follows:

$E(A|B)=\epsilon^2(A,B)+\sigma(B)$ $E(A|C)=\epsilon^2(A,C)+\sigma(C)$ $E(A|D)=\epsilon^2(A,D)+\sigma(D)$.

The sum is a total triangulation error (the total error or the total positioning error), which is:

$S(A|B,C,D)$.

The total positioning error is a sum of the positioning error and the distance error. In this example where the positioning error is zero for a fixed beacon:

$S(A|B,C,D)=E^2(A|B)+E^2(A|C)+E^2(A|D)$.

Figure 5:
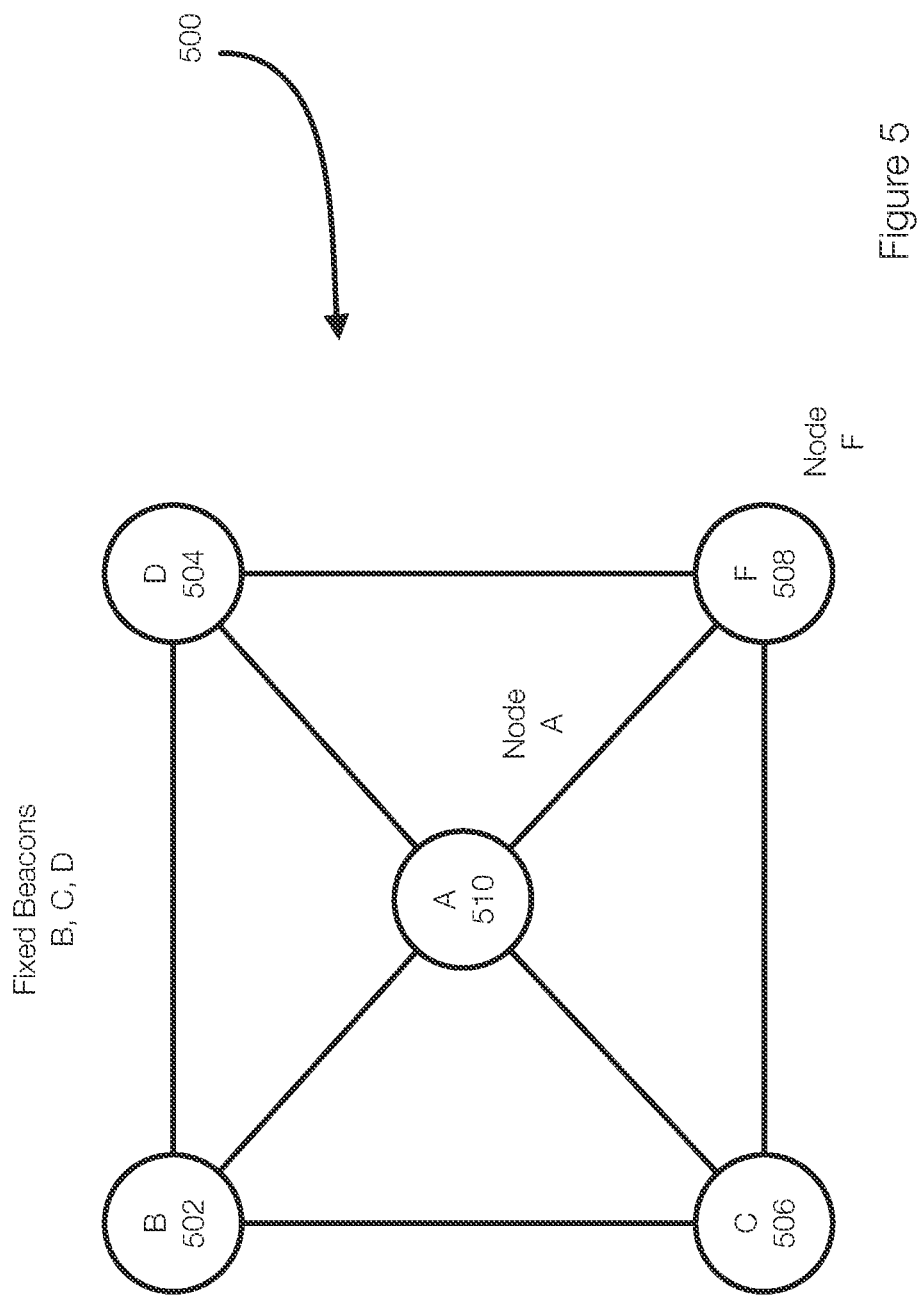
FIG. 5 discloses additional aspects of a node performing a positioning operation using fixed beacons and mobile beacons.

FIG. 5 discloses additional aspects of a positioning operation including determining a total positioning error of a node. FIG. 5 illustrates that a mobile beacon (e.g., a peer mobile node) can improve accuracy in determining the position or positioning errors of nodes in the environment 500.

More specifically, FIG. 5 illustrates an example of determining a total positioning error for a node F 508. This example includes positioning errors determined from two different sets of sources. The first set of sources includes the fixed beacons 502, 504, and 506.

FIG. 5 illustrates that the distance errors are as follows:

$\epsilon(B, C) = \epsilon(C, F) = \epsilon(D, F) = \epsilon(B, D) = 1$, $\epsilon(B, A) = \epsilon(C, A) = \epsilon(F, A) = \epsilon(D, A) = \frac{\sqrt{2}}{2}$.

In the environment 500 and using the first set of sources, the total positioning error of the node F 508 is being determined. Initially, the distance error a for each of the three fixed beacons or sources is 0.

The distance error between the node 506 and the sources 502, 504, and 506 can be described as follows:

$S(F|B,C,D)=E^2(F|C)+E^2(F|B)+E^2(F|D)$ $S(F|B,C,D)=(1^2)^2+(\sqrt{2})^2+(1^2)^2=6$.

Thus, because the position error for the first set of sources is 0 (the sources are all fixed beacons, the total positioning error for the node F 508 using the fixed beacons 502, 504, and 506 as sources is 6.

The second set of sources include the fixed beacons 504 and 506 and the mobile beacon 510. The total positioning error is determined for the second set of sources, which includes the fixed beacons 504 and 506 and the mobile beacon (or peer node) A 510 is determined as follows.

Initially, the positioning errors of the fixed beacons 504 and 506 is zero. The positioning error of the mobile beacon A 510 is determined by the node A 510. In this example, the node A 510 may have used the fixed beacons 502, 504, and 506 as sources. Thus, the positioning error of the mobile beacon A 510 is ($\sigma=0$ for fixed beacons):

$S(A|B, C, D) = E^2(A|C) + E^2(A|B) + E^2(A|D)$ $S(A|B, C, D) = \left(\left(\frac{\sqrt{2}}{2}\right)^2\right)^2 + \left(\left(\frac{\sqrt{2}}{2}\right)^2\right)^2 + \left(\left(\frac{\sqrt{2}}{2}\right)^2\right)^2 = 0.75 = \frac{3}{4}$ Once the positioning error for the mobile beacon A 510 is determined, the total error for the mobile node F 508 can be determined as follows ($\sigma=0$ for fixed beacons 504 and 506):

$S(F|C, A, D) = E^2(F|C) + E^2(F|A) + E^2(F|D)$ $S(F|C, A, D) = (1^2)^2 + \left(\left(\frac{\sqrt{2}}{2}\right)^2 + \left(\frac{3}{4}\right)\right)^2 + (1^2)^2 = 3.56$.

As illustrated the error $E^2$ (F|A) for the source or mobile beacon 510 includes a distance error and a positioning error because the source is a mobile beacon.

Thus, the first set of sources or fixed beacons 502, 504, and 506 results in a total positioning error of 6 while using the second set of sources or fixed beacons 504 and 506 and the mobile beacon 510 results in a total positioning error of 3.56. This demonstrates that because distance has a strong effect on accuracy of the distance measurement, using a node as a mobile beacon can result in lower total positioning errors in some instances. Embodiments of the invention, however, may not simply rely on the closest sources, but on the sources that result in the lowest total positioning error.

In some instances, a mobile beacon may be a better source than a fixed beacon. It may also be possible to incorporate an angle of arrival error into account using a function $\alpha(A|B)$ to account for the expected angle of arrival error when measuring the angle between the transmitter B and the receiver A.

In one example, a node may desire to determine its own position (and/or Angle of Arrival). The node broadcasts a message to this effect to its peers. In this example, peers may include other nodes and/or fixed beacons. All fixed beacons receiving the message emit BLE in response. In one embodiment, all mobile devices (or mobile beacons from the perspective of the node determining its own position) that receive the message and are currently stationary or executing a stationary action also emit BLE plus its last total positioning error. All sources also emit a timestamp for the BLE emission.

The mobile device thus receives the BLE emissions and metadata (timestamps, node ID . . . ) and/or total positioning errors when present. This allows the node to determine its own total positioning error as described at least in FIGS. 3-5. This may include determining an error per source and then a total positioning error based on the error of all sources. These errors may be inserted into a data structure such as a heap, which may be sorted by error.

To determine its position, the node picks the three best elements from the error heap that also have a timestamp smaller than a pre-established error. In other words, the information used to determine the nodes position should be valid and sufficiently close in time to the request. This allows decisions that rely on positions or positioning errors to be based on sufficiently current information.

In one example, the data structure is updated constantly, periodically, or the like such that the errors of the sources are known. In one example, the selecting selection procedure starts at the lowest error node and traverses the data structure in an ordered fashion. All nodes or sources with a timestamp that is too old are rejected. When three good sources are identified, these sources are used to determine a distance using triangulation or other distance calculation technique. Other position determining methods may be used and embodiments are not limited to strictly three sources. More or less sources may be used, if necessary, although the accuracy may depend on the number of sources.

Figure 6:
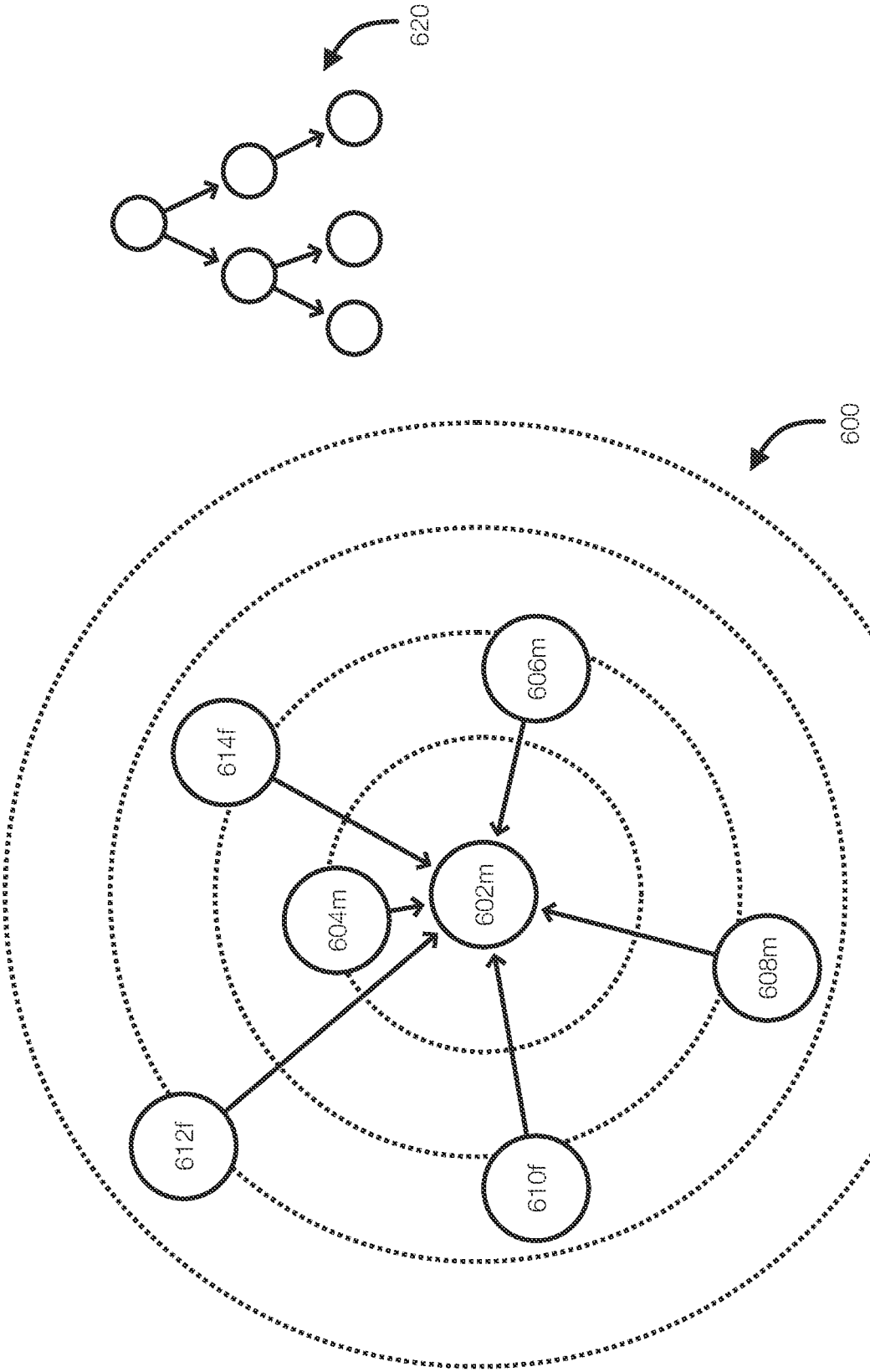
FIG. 6 discloses aspects of an environment in which mobile nodes perform positioning operations using heaps or other data structures.

FIG. 6 illustrates an environment in which mobile objects determine their positions using fixed and/or mobile beacons. In the environment 600, a mobile device 602*m* may determine its position in the environment 600 and/or relative to other mobile devices. Other mobile devices may, from the perspective of the mobile device 602*m*, are considered to be mobile beacons. The environment 600 thus includes mobile beacons 604*m*, 606*m* and 608*m*. The environment 600 includes fixed beacons 610*f*, 612*f*, and 614*f*.

Figure 7:
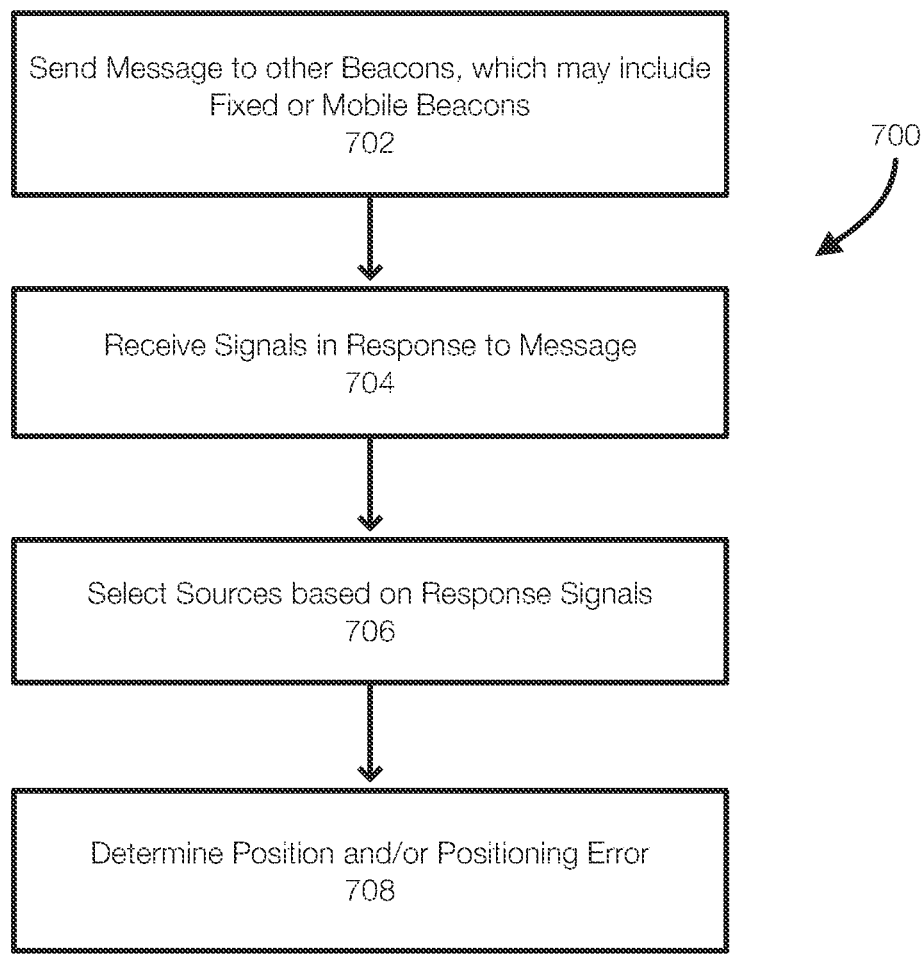
FIG. 7 discloses aspects of performing positioning operations.

FIG. 7 discloses aspects of determining a position and/or a positioning error of a node. The method of determining a position and/or a positioning error of a node (e.g., mobile object or mobile device) is described with respect to FIGS. 6 and 7.

In the method 700, a message may be sent 702 or broadcast by the node 602*m* in the environment 600. The node 602*m* may receive 704 BLE from the beacons that receive the message. In this example, the node 602*m* may receive BLE from the beacons 604*m*, 606*m*, 608*m*, 610*f*, 612, and 614*f*. Positioning errors may be received from the mobile beacons 604*m*, 606*m*, and 608*m*. Other metadata received from the beacons 604*m*, 606*m*, 608*m*, 610*f*, 612, and 614*f* may include an identifier, a timestamp, and/or other data, numbers, or arrays.

In one example, the metadata may be stored in a heap 620, which may be sorted. The timestamp may be included in the heap 620. As a result, sources to perform a position operation may be selected from using the heap 620. Thus, sources for the positioning operation are selected 706 using the heap 620. Selected sources may include those that have a timestamp smaller than a pre-established error (e.g., not older than 1 s). In one example, multiple sets of sources may be selected such that positioning errors can be compared.

Once the sources are selected, the position and/or positioning error are determined 708. As previously stated, the distance between the node and each of the sources may be determined at the node using the RSSI of the BLE emissions. The position can be determined using these measurements by performing, by way of example, a triangulation procedure. The total positioning error allows the accuracy of the position measurement to be qualified. Selecting the best set of sources may improve the accuracy by reducing the total positioning error.

By tracking information across each of the nodes, it is possible to ensure that only the latest peers are used when determining a position.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of logistics operations, which include by way of example and not limitation, positioning operations, position/location determining operations, positioning error operations, event detection operations, cornering detection operations, tracking operations, trajectory prediction operations, trajectory operations, alerting/warning operations, management operations, or the like or combination thereof. More generally, the scope of the invention embraces any operating environment in which the disclosed concepts may be useful.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment. Similarly, data components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: sending a message, by a node, to beacons in an environment, wherein the beacons include fixed beacons and mobile beacons, receiving signals and metadata from the beacons in response to the message, selecting sources from the beacons for determining a position and/or a total positioning error of the node, and determining the position and/or the total positioning error of the node in the environment using errors associated with the selected sources.

Embodiment 2. The method of embodiment 1, wherein each of the fixed beacons is associated with a distance error, wherein each of the mobile beacons is associated with a distance error and a positioning error.

Embodiment 3. The method of embodiment 1 and/or 2, wherein a positioning error of the fixed beacons is zero.

Embodiment 4. The method of embodiment 1, 2, and/or 3, wherein at least one of the sources is a mobile beacon.

Embodiment 5. The method of embodiment 1, 2, 3, and/or 4, wherein the metadata received from the sources includes a timestamp and wherein metadata from sources that are mobile beacons include a last position error.

Embodiment 6. The method of embodiment 1, 2, 3, 4, and/or 5, wherein the total positioning error is a total triangulation error that is based on position errors and distance errors from each of the sources.

Embodiment 7. The method of embodiment 1, 2, 3, 4, 5, and/or 6, wherein the mobile beacon, when selected as a source, is stationary or performing a stationary task.

Embodiment 8. The method of embodiment 1, 2, 3, 4, 5, 6, and/or 7, wherein the signals comprise BLE emissions and wherein a distance for each source is determined from corresponding RSSI (Received Signal Strength Indication) of the BLE emissions.

Embodiment 9. The method of embodiment 1, 2, 3, 4, 5, 6, 7, and/or 8, further comprising determining the position using a triangulation method, wherein an accuracy of the position is quantified by the total positioning error.

Embodiment 10. The method of embodiment 1, 2, 3, 4, 5, 6, 7, 8, and/or 9, wherein the errors of the beacons, when received at the node, are stored in a heap, wherein the sources are selected by traversing the heap and wherein sources associated with timestamps that are older than a threshold are discarded.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. Nodes may be examples of special purpose or general-purpose computers, in virtual or physical form. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module', 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
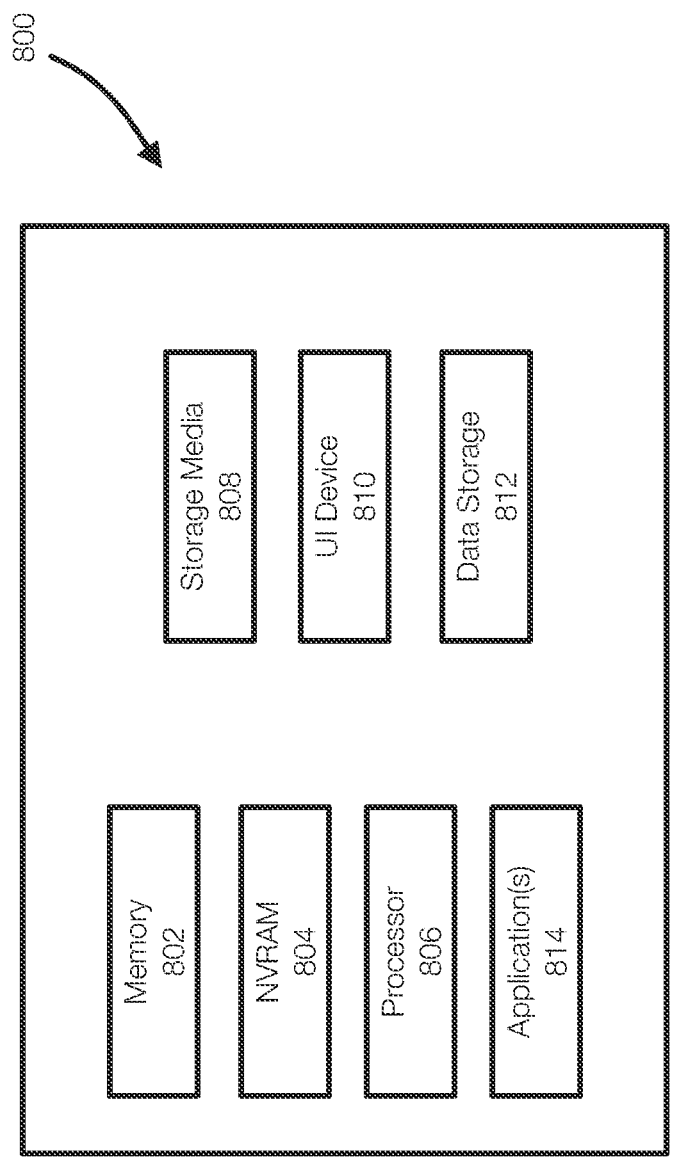
FIG. 8 discloses aspects of a computing device, a computing system, or a computing entity.

With reference briefly now to FIG. 8, any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an environment in which nodes are operating, a method for determining positions of nodes operating in the environment, the method comprising:
    sending a message, by a node operating and moving in the environment, to beacons in the environment, wherein the beacons include fixed beacons and mobile beacons;
    receiving signals and metadata from the beacons in response to the message;
    determining errors associated with each of the beacons and storing the errors;
    selecting sources from the beacons for determining a position and/or a total positioning error of the node in the environment based on timestamps associated with the signals and metadata received from the beacons, wherein sources associated with timestamps that are older than a threshold are discarded; and
    determining the position and/or the total positioning error of the node in the environment using the errors associated with the selected sources.

2. The method of claim 1, wherein each of the fixed beacons is associated with a distance error, wherein each of the mobile beacons is associated with a distance error and a positioning error.

3. The method of claim 2, wherein a positioning error of the fixed beacons is zero.

4. The method of claim 2, wherein at least one of the sources is a mobile beacon.

5. The method of claim 4, wherein the metadata received from the sources includes a timestamp and wherein metadata from sources that are mobile beacons include a last position error.

6. The method of claim 5, wherein the total positioning error is a total triangulation error that is based on position errors and distance errors from each of the selected sources.

7. The method of claim 4, wherein the mobile beacon, when selected as a source, is stationary or performing a stationary task.

8. The method of claim 1, wherein the signals comprise BLE emissions and wherein a distance for each source is determined from corresponding RSSI (Received Signal Strength Indication) of the BLE emissions.

9. The method of claim 8, further comprising determining the position using a triangulation method, wherein an accuracy of the position is quantified by the total positioning error.

10. The method of claim 1, wherein the errors of the beacons are stored in a heap, wherein the sources are selected by traversing the heap.

11. In a system in which nodes are operating in an environment, a non-transitory storage medium having stored therein instructions that are executable by one or more hardware processors to perform operations for determining positions of nodes operating in the environment, the operations comprising:
    sending a message, by a node operating and moving in the environment, to beacons in the environment, wherein the beacons include fixed beacons and mobile beacons;
    receiving signals and metadata from the beacons in response to the message;
    determining errors associated with each of the beacons and storing the errors;
    selecting sources from the beacons for determining a position and/or a total positioning error of the node in the environment based on timestamps associated with the signals and metadata received from the beacons, wherein sources associated with timestamps that are older than a threshold are discarded; and
    determining the position and/or the total positioning error of the node in the environment using the errors associated with the selected sources.

12. The non-transitory storage medium of claim 11, wherein each of the fixed beacons is associated with a distance error, wherein each of the mobile beacons is associated with a distance error and a positioning error.

13. The non-transitory storage medium of claim 12, wherein a positioning error of the fixed beacons is zero.

14. The non-transitory storage medium of claim 12, wherein at least one of the sources is a mobile beacon.

15. The non-transitory storage medium of claim 14, wherein the metadata received from the sources includes a timestamp and wherein metadata from sources that are mobile beacons include a last position error.

16. The non-transitory storage medium of claim 15, wherein the total positioning error is a total triangulation error that is based on position errors and distance errors from each of the selected sources.

17. The non-transitory storage medium of claim 14, wherein the mobile beacon, when selected as a source, is stationary or performing a stationary task.

18. The non-transitory storage medium of claim 11, wherein the signals comprise BLE emissions and wherein a distance for each source is determined from corresponding RSSI (Received Signal Strength Indication) of the BLE emissions.

19. The non-transitory storage medium of claim 18, further comprising determining the position using a triangulation method, wherein an accuracy of the position is quantified by the total positioning error.

20. The non-transitory storage medium of claim 11, wherein the errors of the beacons are stored in a heap, wherein the sources are selected by traversing the heap.

* * * * *